United States Patent
Kumar

(10) Patent No.: US 8,600,437 B2
(45) Date of Patent: Dec. 3, 2013

(54) PORTABLE COMPUTING, COMMUNICATION AND ENTERTAINMENT DEVICE WITH CENTRAL PROCESSOR CARRIED IN A DETACHABLE PORTABLE DEVICE

(75) Inventor: Rajendra Kumar, Akron, OH (US)

(73) Assignee: Khyber Technologies Corporation, Akron, OH (US)

( * ) Notice: Subject to any disclaimer, the term of this patent is extended or adjusted under 35 U.S.C. 154(b) by 362 days.

(21) Appl. No.: 12/133,980

(22) Filed: Jun. 5, 2008

(65) Prior Publication Data

US 2008/0273297 A1    Nov. 6, 2008

(51) Int. Cl.
*H04M 1/00* (2006.01)

(52) U.S. Cl.
USPC .............. 455/556.1; 455/556.2; 455/557; 455/558; 455/559; 455/561

(58) Field of Classification Search
USPC .......... 455/556.1, 556.2, 557, 566, 552.1, 88, 455/422.1, 456.1–561, 552
See application file for complete search history.

(56) References Cited

U.S. PATENT DOCUMENTS

| | | |
|---|---|---|
| 5,189,632 A | 2/1993 | Paajanen |
| 5,530,852 A | 6/1996 | Meske, Jr. et al. |
| 5,625,673 A | 4/1997 | Grewe et al. |
| 5,754,962 A | 5/1998 | Griffin |
| 5,761,662 A | 6/1998 | Dasan |
| 5,799,068 A * | 8/1998 | Kikinis et al. ............. 379/93.06 |
| 5,974,334 A * | 10/1999 | Jones, Jr. .................... 455/556.2 |
| 6,069,593 A * | 5/2000 | Lebby et al. .................. 345/1.1 |
| 6,115,618 A | 9/2000 | Lebby et al. |
| 6,137,481 A | 10/2000 | Phillipps |
| 6,266,539 B1 | 7/2001 | Pardo |
| 6,343,217 B1 | 1/2002 | Borland |
| 7,120,462 B2 | 10/2006 | Kumar |
| 2002/0068549 A1 | 6/2002 | Tendler |
| 2002/0163778 A1 | 11/2002 | Hazzard et al. |
| 2003/0114186 A1* | 6/2003 | Goetz .......................... 455/552 |
| 2004/0019724 A1 | 1/2004 | Singleton, Jr. et al. |
| 2004/0268005 A1 | 12/2004 | Dickie |
| 2007/0035917 A1 | 2/2007 | Hotelling et al. |
| 2008/0002369 A1 | 1/2008 | Carnevali |

FOREIGN PATENT DOCUMENTS

CN     1196840     10/1998

* cited by examiner

*Primary Examiner* — Manpreet Matharu
(74) *Attorney, Agent, or Firm* — Hahn, Loeser & Parks, LLP

(57) ABSTRACT

A docking display unit for physically engaging a portable computing unit and a combination of the same. The display unit may include or exclude a central processing unit and includes a housing with a hinged first and second region. The first region includes a display screen and the second region includes a keyboard. A recessed docking port is provided in the second region and is configured to receive the portable device therein. At least one connector is provided in the docking port to operationally link a central processor in the portable device with the display screen and keyboard. A touchscreen on the portable device provides a user interface for controlling the combined display unit and portable device. The portable device preferably is a smartphone.

25 Claims, 6 Drawing Sheets

PORTABLE COMPUTING, COMMUNICATION AND ENTERTAINMENT DEVICE WITH CENTRAL PROCESSOR CARRIED IN A DETACHABLE PORTABLE DEVICE

BACKGROUND OF THE INVENTION

1. Technical Field

The present invention relates in general to portable processor-based devices that provide computing, communication or entertainment functionality. More particularly, the present invention pertains to portable processor-based devices operable while being held in its user's hand and providing communications, organizer and/or entertainment functions, such as smartphones, cellular telephones, palm-sized organizers, and MP3 players, and to display type devices that do not independently possess general computing capabilities. More specifically, the present invention relates to systems that detachably mate a plurality of portable processor-based devices to a processor-free display unit that becomes functional only when engaged with the portable device.

2. Background Information

To address consumers' portable computing, mobile communications, and portable entertainment needs, a variety of portable devices have been developed. The distinctly differing requirements of each application has made it too costly and unwieldy for such devices to fulfil more than one type or two closely related types of need.

For example, smart cell phones are devices that combine the capabilities of cell phones and electronic organizers. Typical of such devices are the Model PDQ-800 from Qualcomm, Incorporated of San Diego, Calif., and the Model R380 from Ericsson, Incorporated of Richardson, Tex. These products perform quite well as handheld computing and communication devices by allowing the user to access the Internet for email, stock quotes, etc. while preserving their use as simple wireless phone units. However, in order to allow handheld grasping, these units had to be kept small, thereby limiting their display to a size that is too small for practical use in conventional computing such as Web browsing, word processing, etc. Also, to keep the cost of such devices low, their designers employed central processors that have just enough power to carry out smart phone functions, and not enough power to handle general computing requirements.

Recently, Motorola, Inc. of Schaumburg, Ill. has begun to sell its clipOn Oganizer as an attachment to its StarTAC cellular telephone and to provide it with smart phone functionality. The clipOn Oganizer and StarTAC phone have been designed to operate as individual, stand-alone units that each furnish its own processor and power supply. Consequently, attaching the units does not achieve the reduced size or cost desired in an integrated combination.

For portable computing, the industry provides conventional laptop computers, such as those based on Pentium processors from Intel Corporation of Santa Clara, Calif. and Windows software from Microsoft Corporation of Redmond, Wash., and mini-laptop computers, such as Microsoft WindowsCE based devices, called Handheld Personal Computers (HPCs). The industry has also furnished palm-sized devices for personal information management and organization such as the Palm Pilot from 3Com Corporation of Santa Clara, Calif., and Microsoft WindowsCE-based palm-sized PCs.

To fulfill the portable entertainment needs of consumers, the computer industry provides digital audio players, such as the Diamond Multimedia Rio model made by S3, Inc. of Santa Clara, Calif. that plays MP3 compatible audio content downloaded from the Internet. Another portable entertainment device is the wireless system controller for home entertainment systems provided by Harmon/Kardon International of Woodbury, N.Y.

To fulfill both mobile computing and communication needs, a mobile user has to carry two, and sometimes three devices—a smart phone unit, an organizer, and a laptop unit. Of course, if entertainment is also desired, the user must carry yet another device—the MP3 player. The user has to purchase and maintain multiple units—charging multiple sets of batteries and synchronizing data from one with that of the other. Consequently, there is a need for a device that provides a complete solution for mobile computing, communication and entertainment without having to own and maintain multiple units.

SUMMARY OF THE INVENTION

A docking display unit for physically engaging a portable computing unit and a combination of the same. The display unit may include or exclude a central processing unit and includes a housing with a hinged first and second region. The first region includes a display screen and the second region includes a keyboard. A recessed docking port is provided in the second region and is configured to receive the portable device therein. At least one connector is provided in the docking port to operationally link a central processor in the portable device with the display screen and keyboard. A touchscreen on the portable device provides a user interface for controlling the combined display unit and portable device. The portable device preferably is a smartphone. If the portable device is not docked in the display unit, the display unit is nonfunctional. When the portable device is docked in the display unit, the display screen becomes operational and is useful for displaying input and output from the portable device and the keyboard is useful for inputting data into the portable device.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

One embodiment of an exemplary device in accordance with the present invention for mobile computing, communication and entertainment, is illustrated in FIGS. 1 through 4 and generally indicated by the numeral 10. Device 10 includes a detachable handset unit 20 and a docking display unit 30.

Figure 3:
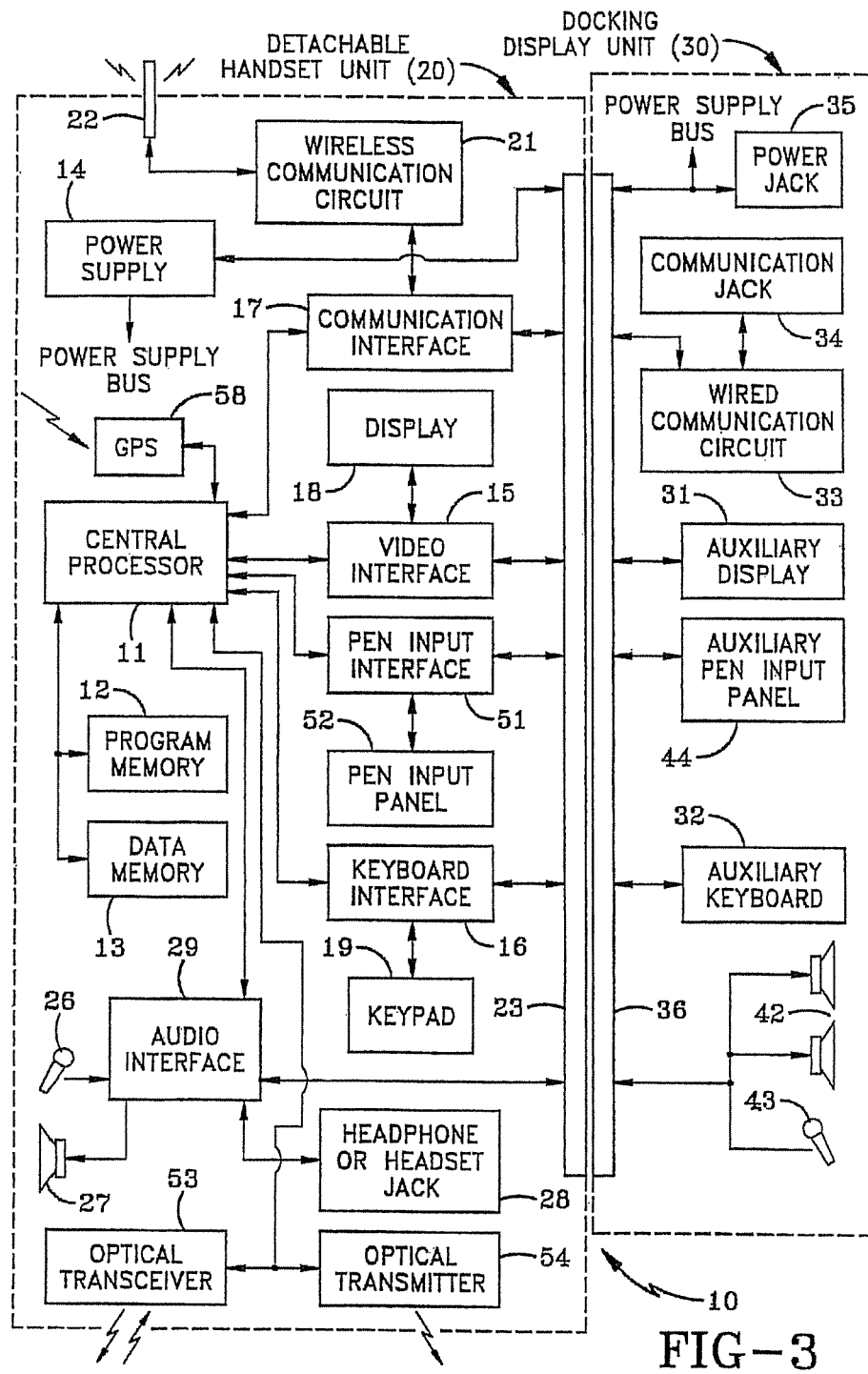
FIG. 3 is an exemplary block diagram of the device shown in FIG. 1.
Figure 6:
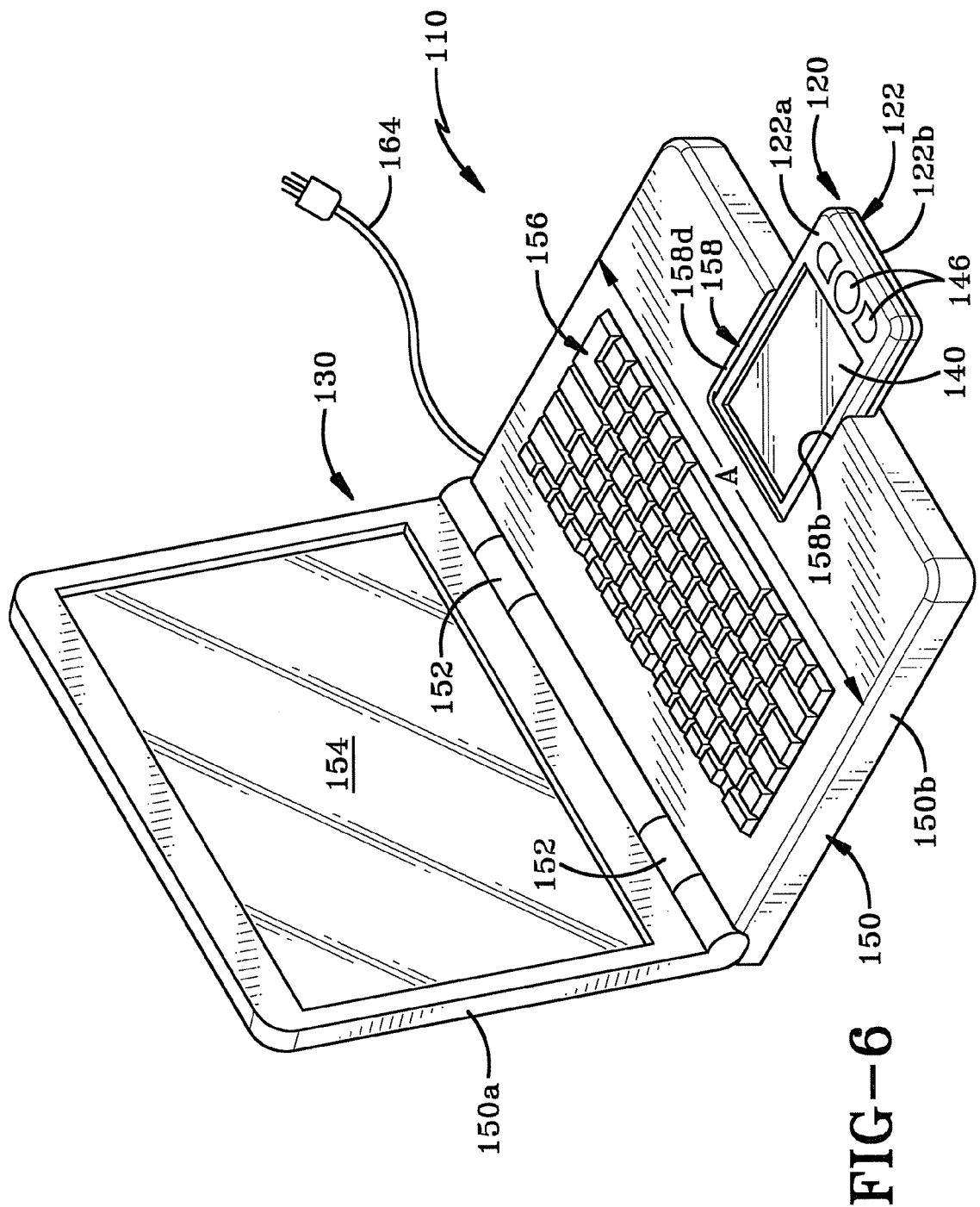
FIG. 6 is a perspective view of a second embodiment of a portable computing, communication and entertainment device in accordance with the present invention.
Figure 7:
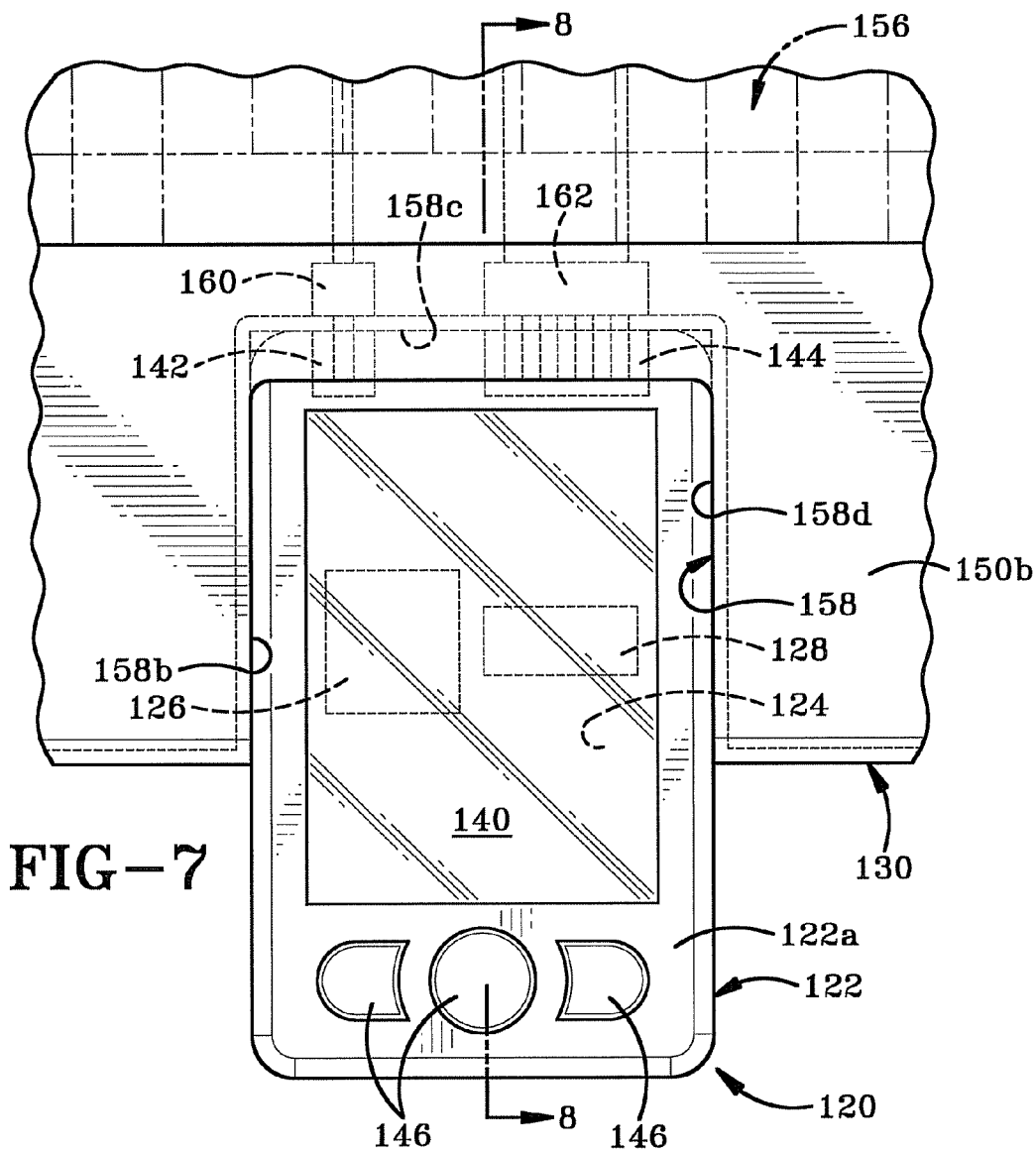
FIG. 7 is an enlarged front view of the detachable portable device shown in a partially docked position with the docking display unit.

Detachable handset unit 20 may also include an electrical connector 23 that carries signals from the central processor 11 through video interface 15, keyboard interface 16, communication interface 17, pen-input interface 51, audio interface 29, and power supply 14. As seen in FIG. 3, the docking display unit 30 does not include a central processor, and one or more of the circuits in the docking display are operated by the central processor 11 of the detachable handset unit. Mating electrical connector 36 in docking display unit 30 may therefore connect these signals to auxiliary display 31, auxiliary keyboard 32, wired communication circuit 33, auxiliary pen-input panel 44, speakers 42 and microphone 43, and power-jack 35. Communication circuit 33 is connected to communication jack for further connection to communication lines such as the public switched telephone network or cell or other wireless network.

Docking display unit 30 includes a recessed platform 38, with an electrical connector 36, a fixed tab 39 and a movable tab 41, retractable by a latch 37. To dock detachable handset unit 20 into docking display unit 30, fixed tab 39 is slid into slot 24 with the front side of detachable handset unit 20 facing platform 38. The other end of detachable handset unit 20 is brought down to have connector 23 on detachable handset unit 20 mate with connector 36 of docking display unit 30. Tab 41 is slid into slot 25 to secure detachable handset unit 20 in place.

Docking display unit 30 is shown as a clamshell style unit, including an auxiliary display 31, in the lid portion and an auxiliary keyboard 32 in the base portion, facing each other in the closed position. The lid of docking display unit 30 also contains a communication jack 34 such as a standard RJ-style telephone jack, and a power jack 36, such as an AC adapter/charger jack.

The block diagram in FIG. 3 shows detachable handset unit 20 including a central processor 11, and the circuits supported and/or controlled by it, namely program memory 12, at memory 13, power supply 14, video interface 15, keyboard interface 16, communication interface 17, pen-input interface 61, and audio interface 29. In turn, video interface 15 drives display 18, the keyboard interface 16 drives the keypad 19, communication interface 17 drives wireless communication circuit 21, pen-input interface 51 drives the pen-input panel 52, and audio interface 29 drives microphone 26 and speaker 27, and connects to the headphone jack 28. Wireless communication circuit 21 is connected to the antenna 22. GPS receiver 58, such as that supplied by SiRF Technology of San Jose, Calif., is also connected to central processor 11.

Detachable handset unit 20 also includes an electrical connector 23 that carries signals from the central processor 11 through video interface 15, keyboard interface 16, communication interface 17, pen-input interface 51, audio-interface 29, and power supply 14. Mating electrical connector 36 in docking display unit 30 connects these signals to auxiliary display 31, auxiliary keyboard 32, wired communication circuit 33, auxiliary pen-input panel 44, speakers 42 and microphone 43, and power-jack 36. Wired communication circuit 33 is connected to communication jack 34 for further connection to external wired communication lines such as the public switched telephone network.

Detachable handset unit 20 may also contain an optical transmitter 54 for transmission of remote control signals to TV, VCR, etc. Alternately, it may be equipped with an optical transceiver 53 for optical communication with other compatible devices such as laptop computers, printers and network interfaces.

In another variation of the above embodiment of the interface signals connecting the circuitry carried in detachable handset unit 20 and docking display unit 30 may be multiplexed using conventional multiplexing circuits, in order to reduce the number of interconnect signals and hence reducing the size of connectors 23 and 36.

In another variation of the above embodiment, detachable handset unit 20 may contain no display at all, like conventional cordless handsets. In this case, central processor 11 will still drive the auxiliary display 31 through the video interface 15, and video interface 15 may be housing in docking display unit 30, further reducing the size of detachable handset unit 20.

Figure 1:
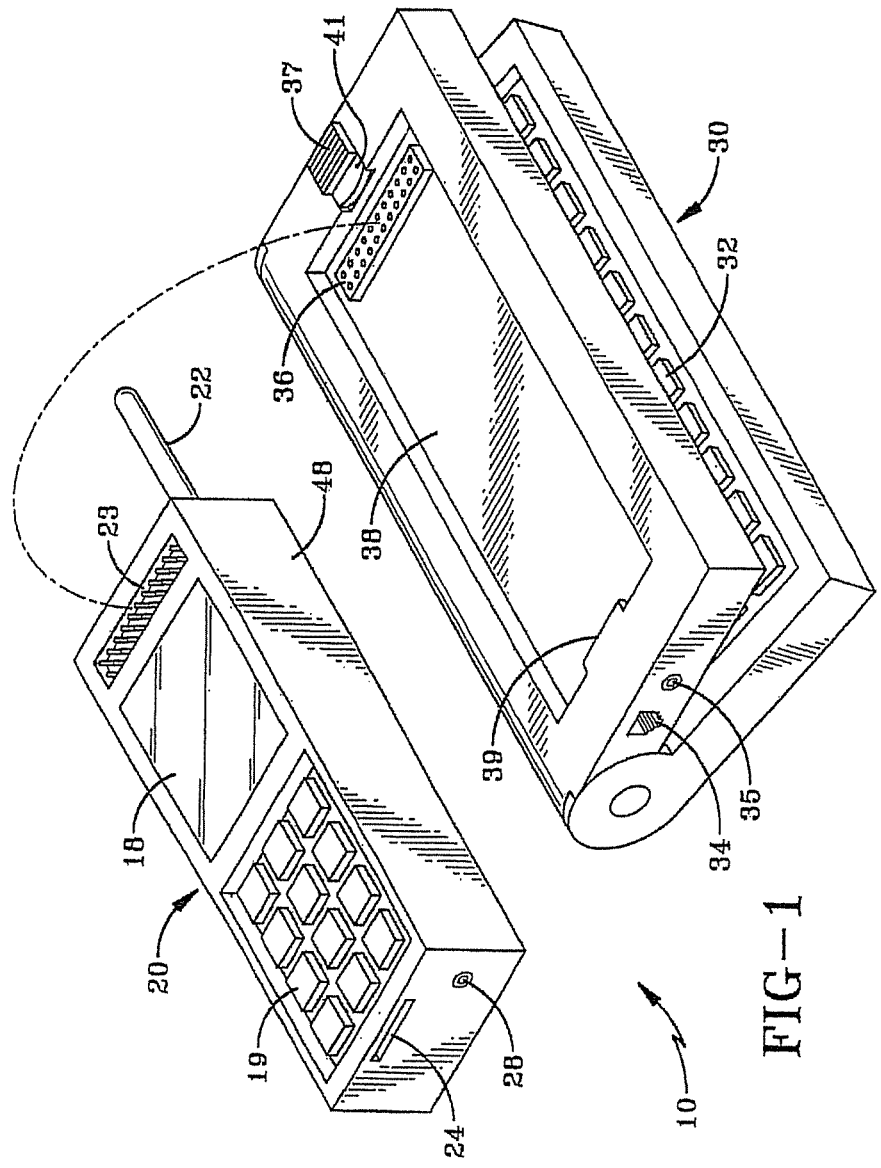
FIG. 1 is a perspective view of an exemplary device in accordance with the present invention for mobile computing, communication and entertainment. This view presents a front perspective view of a detachable handset unit and a top perspective view of a clamshell shaped docking display unit having a partially open lid and base, and illustrates diagrammatically how exemplary electrical connectors in each unit may engage and mate so that the units form a single combined device.
Figure 2:
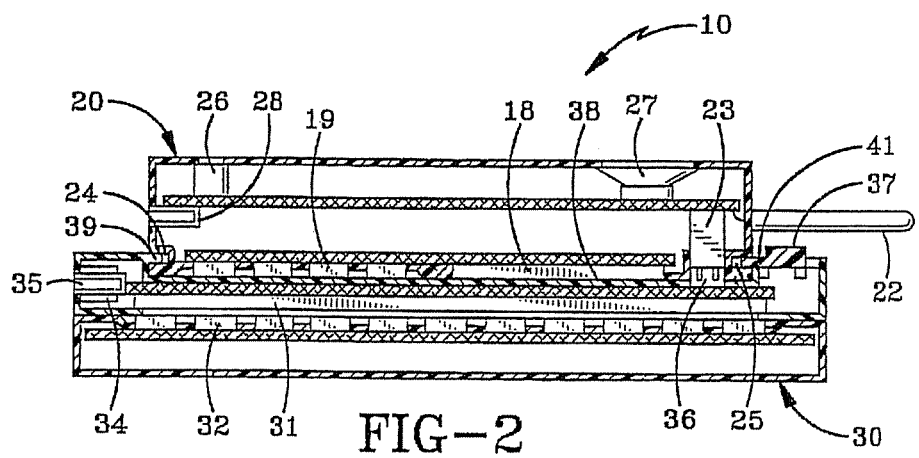
FIG. 2 is a cross-section elevational view of the exemplary device shown in FIG. 1 with the detachable handset unit mated with the docking display unit.
Figure 4:
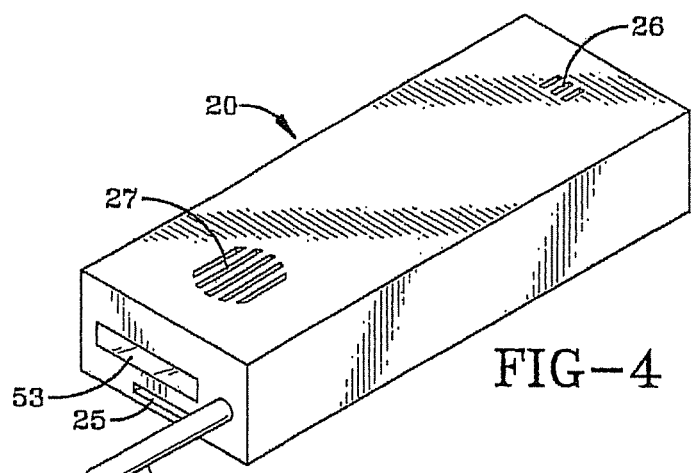
FIG. 4 is a rear perspective view of the detachable handset unit.
Figure 5:
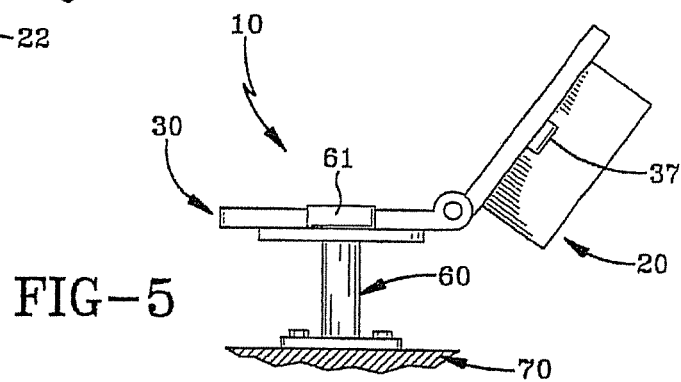
FIG. 5 is a side elevational view of the device shown in FIG. 1 when mounted in a vehicle and in an operational configuration.

FIG. 5 shows docking display unit 30 mounted on the floor of a vehicle 70. The bottom end of a pedestal 60 is attached to the vehicle floor 70. Clamps 61 are attached to the top end of pedestal 60. Docking display unit 30 can be removably mounted on pedestal 60 using bolts or other conventional methods. Detachable handset unit 20 can then be docked in docking display unit 30 in the same manner as in other applications described hereinbefore.

The ordinarily skilled artisan should now appreciate that in this way a portable device for computing, communication and/or entertainment can be created that has a detachable handset unit. When mated with a docking display unit, the detachable handset unit becomes the controller for the entire portable computing, communication and entertainment device. The detachable handset unit is in a smaller housing that is dimensioned for handheld grasping, and is sized to be carried in a pocket like an average cell phone. The docking display unit carries an auxiliary, larger display and other components. The central processor, carried in the detachable handset unit, and being used to operate the docking display unit, must have enough processing power to adequately perform functions of an entire portable computing, communication and entertainment device, and not just the function of a wireless phone. Examples of commercially available processors adequate for this task include the Intel StrongARM processor, the models SH-3 and SH-4 processors from Hitachi American, Ltd. of Brisbane, Calif., and the model 4100RISC processor from NEC America, Inc. of Irving, Calif.

As technology advances in the future, the Pentium processor from Intel, used in most laptop computers, may be used in other embodiments of the current invention. The other components used in device 10 can be similar to those employed by traditional computing devices, communication devices and entertainment devices. Typical of these other components are: liquid crystal displays of small and large sizes from Optrex America Inc. of Detroit, Mich., and Seiko Instruments USA, Incorporated of Torrance, Calif.; memory chips from Micron Technologies, Inc. of Boise, Id., VLSI Technologies wireless communication chips available from Philips North America in Atlanta, Ga., power supply chips from Analog Devices Inc. of Norwood, Mass., and pen-input panels from MicroTouch Systems, Inc. of Methuen Mass.

Device 10 as described hereinbefore will require operating system software such as Microsoft Windows or WindowsCE. Off-the-shelf application software such as Microsoft Outlook, PocketWord, etc. can be used for various tasks. Alternately, the Java software platform from Sun Microsystems, Inc. of Palo Alto, Calif., can be implemented in device 10. In this instance, Java applets can be downloaded into device 10 from the Internet via wireless communication circuit 21 or via wired communication circuit 33.

Referring to FIGS. 6-9, there is shown a second embodiment of a portable device for computing, communication and/or entertainment, said device being generally indicated by the numeral 110. Device 110 comprises a detachable portable device 120 and a docking display unit 130.

Detachable portable device 120 is contemplated to be any portable electronic device that a user may select to provide a range of computing, communication and entertainment applications. Preferably, portable device 120 is a smartphone that is used for such applications. Examples of smartphones suitable for use as portable device 120 include the i900 smartphone made by Samsung Electronics Co. Ltd. of the Republic of Korea, or the Portégé G810 made by the Toshiba Corporation of Tokyo, Japan. These smartphones have a wide range of capabilities beyond being useful as a phone. They permit the user to browse the Internet, send and receive text messages, act as navigation devices, organize personal information, are media players that may be used to play music, view videos, take and transmit photographs, they may be used for reading documents in various formats and for gaming, to name but a few applications. These devices preferably include a touchscreen for user interface but may additionally be provided with a keyboard and directional pads for gaming. They are preferably, but not necessarily, designed for wireless communication. It will be understood that any type of smartphone or portable personal communications device may be utilized in the present invention without departing from the spirit thereof.

Portable device 120 includes a housing 122 having a top 122a and a bottom 122b that are secured together. Top 122a and bottom 122b define an interior cavity 124 within which is retained a variety of components that enable the device to be used for all of the above-named applications. Specifically, portable device 120 includes a central processing unit 126 and a rechargeable power supply 128 for powering the same. Both the central processing unit 126 and power supply 128 are retained within cavity 124. Top 122a of housing 122 is provided with a touchscreen 140 that acts as a primary user interface for the device. Housing is also provided with a power jack 142, one or more communications jacks 144, control buttons 146 for switching the device on and off etc. Although not illustrated for the sake of clarity, housing 122 further contains circuitry therein that links the various components to power supply 128 so that the various components may be powered thereby. Portable device 120 is designed to be easily grasped in the hand and is of a size that preferably will permit the user to slip the same into a pocket in their clothing.

In accordance with a specific feature of the present invention, display unit 130 is designed and manufactured to be complementary to a specific portable device 120 and to act as a docking station for the same. Consequently, different portable devices will be designed to dock with their own specially designed docking display units 130. The display unit 130 in accordance with the present invention preferably is a notebook-type device having the external appearance of a laptop computer. Display unit 130 may be a device that includes a central processing unit or may be a device that is devoid of a central processing unit and is merely a shell. Preferably, display unit 130 has the configuration of a laptop computer, but it will be understood that a desktop computer could also incorporate a docking port for physically engaging a portable device 120 therein.

In accordance with a specific feature of the present invention, display unit 130 comprises a housing 150, preferably of a clamshell type, having a first region 150a and a second region 150b secured together by a hinge 152. Preferably, first region 150a includes a display screen 154, such as a liquid crystal display screen, and second region 150b includes a keyboard 156. First region 150a is foldable onto second region 150b when the device is not in use or needs to be transported. Display unit 130 does not include a touch pad or track pad for user interface. Display unit 130 does, however, includes circuitry (not shown) that operationally connect a power jack connector 160 and a communication jack connector 162 to display screen 154, keyboard 156 and to a rechargeable power supply (not shown). However, unless and until portable device 120 is engaged with display unit 130, as will be hereinafter described, these circuits remain open and neither the keyboard 156 nor the display screen 154 can be activated. 130. When portable device 120 is docked in display unit 130, the power supply in the portable device 120 is recharged by the power supply in the display unit 130. Display unit 130 is also connectable via a power cord 164 and AC/DC adapter (not shown) to a remote AC power source to recharge the power supply in the display unit 130. If the display unit 130 is connected to the remote AC power source when portable device 120 is docked therewith, the remote AC power source will recharge the power supply in the portable device 120. The rechargeable power supply in display unit 130 also powers functions such as lighting the display screen 154 when portable device 120 is docked with display unit 130.

Figure 9:
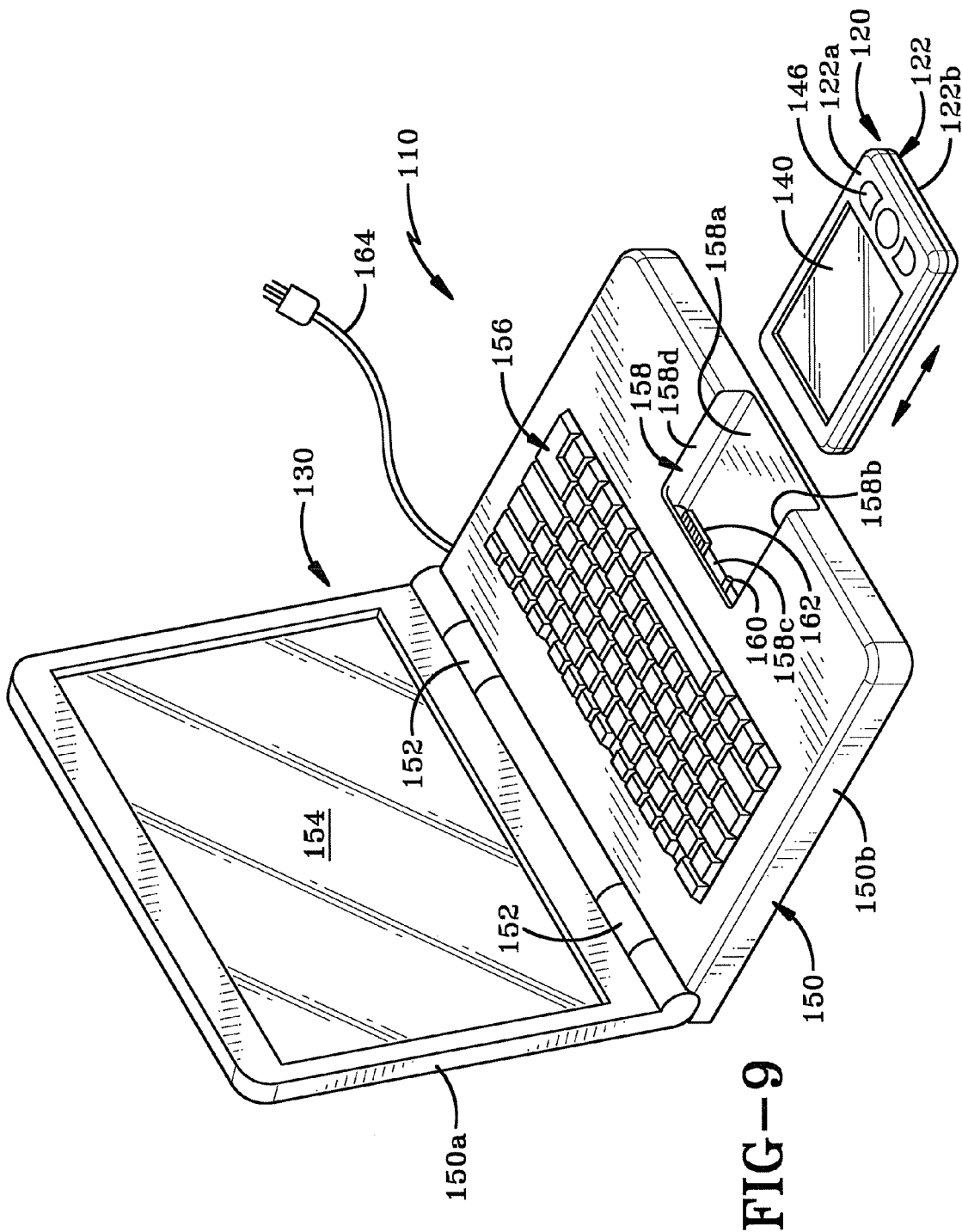
FIG. 9 is a perspective view portable device showing the detachable portable device completely disengaged from the docking display unit.

In accordance with a specific feature of the present invention and as shown in FIG. 9, second region 150b of housing 150 defines a docking port 158 therein. Docking port 158 preferably is disposed in a location adjacent keyboard 156 and in a region where a touch pad for a conventional laptop computer would normally be located. In the attached figures, docking port 158 is situated in the middle of the front edge of second region 150b and docking port 158 is oriented substantially at right angles to the length "A" of the front edge. Docking port 158 is therefore designed to receive a portable device 120 that will be disposed at right angles to the front edge of the second region 150b. It will be understood, however, that docking port 158 may alternatively extend inwardly from a side edge of second region 150b and be disposed substantially parallel to the length "A" of second region 150b. The portable device that is received in this alternatively oriented docking port will be inserted into said docking port at right angles to the side edge thereof.

Figure 8:
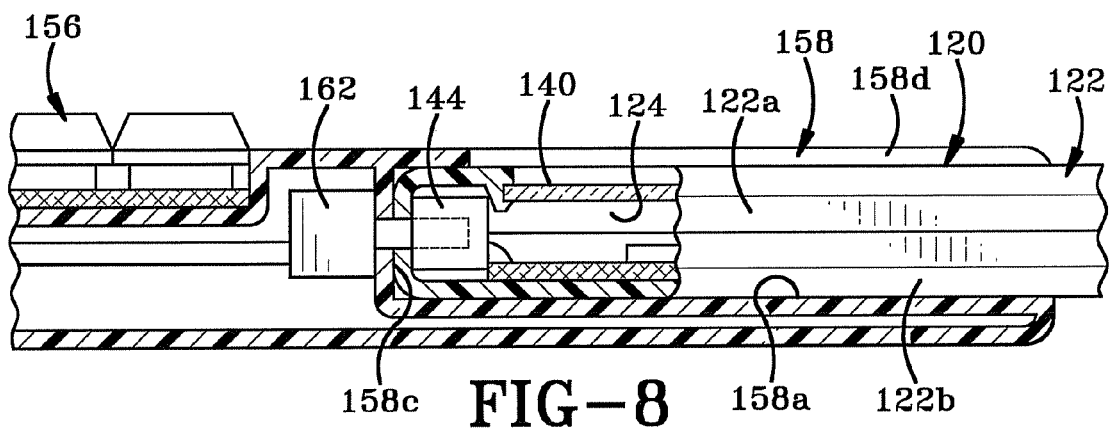
FIG. 8 is a cross-sectional side view of the detachable portable device and docking display unit taken through line 8-8 of FIG. 7.

Referring to FIGS. 6-9, docking port 158 is recessed into the external surface of the front edge of second region 150b and at right angles to length "A". Docking port 158 is defined by a bottom wall 158a and a peripheral wall extending upwardly therefrom. Peripheral wall comprises side walls 158b, 158c, and 158d. Side wall 158b originates in the front edge of second region 150b and side wall 158d terminates in the front edge thereof. Consequently, side wall 158b is spaced a distance away from side wall 158d and a gap is defined therebetween. This gap, which is disposed opposite side wall 158c, constitutes a slot into which portable device 120 is insertable. A power jack connector 160 and a communications jack connector 162 are provided on side wall 158c. Power jack connector 160 and communications jack connector 162 may be recessed into side wall 158c or may extend outwardly from side wall 158c and for a short distance over bottom wall 158a. Connectors 160, 162 are disposed in positions where they will be engageable with power jack 142 and communications jack 144 on portable device 120. The exact positions of power jack connector 160 and communications jack connector 162 are determined by the type of portable device 120 that is to be docked in docking port 158. As shown in FIG. 8, a small region of the upper wall of second region 150b extends outwardly beyond side wall 158c and for a short distance over bottom wall 158a. This small region acts as a guide for proper seating of portable device 120 in docking unit 130. It also protects power jack connector 160 and communications jack connector 162 from accidental impact.

Portable device 120 is docked with display unit 130 by inserting portable device 120 into the gap formed between side walls 158b, 158d and into docking port 158 (FIG. 9). Care must be taken to ensure that the correct leading edge of portable device 120 is inserted first into docking port 158, the correct leading edge being the side on which the power jack 142 and communications jack 144 are provided. The bottom 122b of housing 122 of portable device 120 is slid along the bottom wall 158a of docking port 158. As portable device 120 slides along bottom wall 158a of docking port 158, the leading edge slides under the lip formed by the upper wall of second region 150b and power jack 142 engages power jack connector 160 and communications jack 144 engages communications jack connector 162. As shown in FIGS. 6-9, docking port 158 preferably is oriented substantially at right angles to the length "A" of display unit 130. This orientation places touchscreen 140 and control buttons 146 in a suitable position for easy activation by the user. The orientation of portable device 120 also ensures that the portion of portable device 120 including touchscreen 140 has a solid base under it in the form of bottom wall 158a. Consequently, any downward pressure on touchscreen 140 will not result in a downward rotation of portable device 120 that would cause power and communications jacks 142, 144 and power and communication jack connectors 160, 162 to disconnect. The small lip of the upper wall of second region 150b that extends over the front edge of portable device 120 also aids in preventing downward rotation of portable device 120.

Once portable device 120 is engaged in docking port 158 and is thereby fully docked into display unit 130, the central processing unit 126 of portable device 120 becomes the brain of display unit 130 and is able to control the display screen 154 and keyboard 156. Portable device 120 is provided with all of the software that switches the user interfaces as necessary between touchscreen 140 and keyboard 156 and is used to drive both portable device 120 and display unit 130 when they are operationally connected together. The results of the activation and manipulation of touchscreen 140 and keyboard 156 are displayed on display screen 154 of display unit 130. Display unit 130 effectively acts as a device for enlarging the display of portable device 120 which would typically only be viewable only on touchscreen 140. Display unit 130 also makes it easier for the user to type text using the full size or almost full size keyboard 154, thus making it easier to input data into portable device 120. Although not specifically illustrated herein, display unit 130 may also be provided with speakers or with a connection to external speakers that can enhance the audio output from portable device 120. Consequently, when portable device 120 is docked with display unit 130, the output from portable device 120, whether visual or auditory, is enhanced.

When the user no longer needs the enlarged display screen 154 and keyboard 156, they slide portable device 120 out of docking port 158. This deactivates display unit 130 causing it to revert to being merely a shell. Display unit 130 may then be folded up for transportation or storage as previously described. The user will dock portable device 120 with display unit 130 when full notebook functionality is required. When full notebook functionality is no longer required, portable device 120 will be detached from display unit 130 Portable device 120, once fully detached from display unit 130 is useful as the small handheld computing, communication and entertainment device it was manufactured to be.

Device 110 is therefore an electronic device that comprises a first docking portion, being display unit 130, which has a housing with a first set of electronic circuits that provide a first set of functions. The housing defines a recessed docking port therein. Device 110 further comprises a second portable electronic device, being portable unit 120, which has a housing, at least a region of which is complementary shaped to fit into the recessed docking port. The portable unit 120 has a second set of electronic circuits that perform a second set of functions. The portable unit 120 is physically docked into the display unit 130. A communications port connects the display unit 130 and portable unit 120 so that the first and second sets of electronic circuits are operationally connected. In the attached figures, that communications port comprises one or more jacks on the portable unit 120 and complementary connectors on the display unit 130. It will be understood, however, that the communications port could comprise a wireless connection between the first and second sets of electronic circuits in the display unit 130 and portable unit 120. The communications port enables communication between the first set of electronic circuits and the second set of electronic circuits such that when portable unit 120 is physically engaged in docking port, display unit 130 takes on the second set of functions.

Docking port 158 is recessed into the second region 150b of the docking unit 130 and the gap between side walls 158b, 158d opens at the edge of second region 150b. Consequently, portable unit 120 may be slidably inserted into this gap when first region 150a is in a folded or closed position (not shown) relative to second region 150b or is in an open position relative thereto, such as is illustrated in the attached figures.

In the foregoing description, certain terms have been used for brevity, clearness, and understanding. No unnecessary limitations are to be implied therefrom beyond the requirement of the prior art because such terms are used for descriptive purposes and are intended to be broadly construed and are not limited to the exact details shown or described. Inasmuch as the present invention is subject to variations, modifications and changes in detail, some of which have been stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of devices for mobile computing, communication and entertainment.

What is claimed is:

1. A docking display unit for use with a portable computing device having a central processing unit and a tactile user interface; said display unit comprising:

a housing having:

a first region;
a second region;
a display screen mounted in the first region;
a keyboard mounted in the second region;
a docking port, at least partially complementary to the portable computing device, defined in the second region and being adapted to receive the portable computing device therein such that downward pressure on the tactile user interface will not result in a downward rotation of the portable computing device relative to the keyboard; and
at least one connector provided in the docking port; said connector being adapted to physically engage the portable computing device and thereby attach the portable computing device with the housing; and
whereby the tactile user interface is operably connected to the display screen when the portable computing device is attached with the housing.

2. The docking display unit as defined in claim 1, wherein the second region has an interior wall, an exterior wall, a front edge, a rear edge and a pair of opposed side edges; and the keyboard is mounted in the interior wall; and wherein the docking port comprises;
a recess defined in the interior wall; said recess including a bottom wall spaced a distance away from the interior wall; a peripheral wall extending from the bottom wall to the interior wall; and
wherein the peripheral wall is configured to be complementary to at least a portion of the portable computing device.

3. The docking display unit as defined in claim 2, wherein the peripheral wall originates at a first position along the front edge of the second region and terminates at a second position along the front edge; whereby a gap is defined between the first and second positions; and the gap is complementary in size to at least a portion of the portable computing device.

4. The docking display unit as defined in claim 3, wherein the peripheral wall includes a first side wall that originates at the first position; a third side wall that terminates at the second position, and a second side wall extending between the first and third side walls and disposed opposite the gap; and wherein the bottom wall extends between the first, second and third side walls and terminates at the front edge.

5. The docking display unit as defined in claim 4, wherein the at least one connector is provided in one of the first, second and third side walls.

6. The docking display unit as defined in claim 5, wherein the at least one connector is an electrical connector.

7. The docking display unit as defined in claim 6, further comprising a second connector provided in one of the first, second and third side walls; wherein the second connector is adapted to be operatively engaged with the central processing unit of the portable computing device.

8. A docking display unit for use with a portable computing device having a central processing unit; said display unit comprising:
a housing having:
a first region;
a second region having an interior wall, an exterior wall, a front edge, a rear edge, and a pair of opposed side edges;
a hinge connecting the first and second regions together; whereby the first region may selectively be folded over the second region;
a display screen mounted in the first region;
a keyboard mounted in the interior wall of the second region;
a docking port defined in second region and being adapted to receive the portable computing device therein;
at least one connector provided in the docking port; said connector being adapted to physically engage the portable computing device and thereby attach the portable computing device with the housing;
wherein the docking port comprises a recess defined in the interior wall; said recess including a bottom wall spaced a distance away from the interior wall; a peripheral wall extending from the bottom wall to the interior wall and originating at a first position along the front edge of the second region, and terminating at a second position along the front edge, and whereby a gap is defined between the first and second positions and complementary in size to at least a portion of the portable computing device;
wherein a portion of the interior wall of the second region extends for a distance beyond the peripheral wall, thereby forming a lip which extends outwardly beyond the at least one connector.

9. The docking display unit as defined in claim 1, wherein the display unit further includes a rechargeable power supply that is selectively operationally connectable to a remote power source; and wherein the at least one connector on the display unit is operationally connected to the rechargeable power supply and is adapted to provide power to the portable computing device when docked in the docking port.

10. The docking display as defined in claim 1 in which the docking display unit is free of a central processor.

11. In combination:
a docking display unit and a portable computing device selectively engageable therewith;
said display unit comprising:
a housing having a first region and a second region; whereby the first region is selectively foldable onto the second region;
a display screen provided in the first region;
a docking port defined in the second region;
at least one connector provided in the docking port; and
said portable device comprising:
a housing, at least a portion of which is complementary to the docking port of the display unit;
a central processing unit disposed within the housing of the portable device;
at least one jack provided on the housing of the portable device and being operationally connected to at least one connector on the display unit when the portable device is physically received within the docking port, whereby the portable device is electronically connected to the display unit; and
a user interface, whereby the user interface is exposed to allow physical manipulation by the user when the portable computing device is engaged with the docking display, the portable computing device being engaged by the docking display such that physical manipulation of the user interface by the user will not result in movement of the portable computing device relative to the docking display, and whereby the user interface is operably connected to the display screen of the display unit when the portable computing device is engaged with the docking display.

12. The combination of claim 11, wherein the second region of the display unit has an interior wall, an exterior wall, a front edge, a rear edge and a pair of opposed side edges; and a keyboard mounted in the interior wall; and wherein the docking port comprises;

a recess defined in the interior wall; said recess including a bottom wall spaced a distance away from the interior wall; and a peripheral wall extending from the bottom wall to the interior wall; and wherein the peripheral wall is configured to be complementary to at least a portion of the portable computing device.

13. The combination as defined in claim 12, wherein the peripheral wall originates at a first position along the front edge of the second region and terminates at a second position along the front edge thereof; whereby a gap is defined between the first and second positions; and the gap is complementary in size to at least the portion of the portable computing device.

14. The combination as defined in claim 13, wherein the peripheral wall includes a first side wall that originates at the first position; a third side wall that terminates at the second position, and a second side wall that is disposed between the first and third side walls and opposite the gap; and wherein the bottom wall extends between the first, second and third side walls and terminates at the front edge; and wherein the at least one communications connector is provided in one of the first, second and third side walls.

15. The combination as defined in claim 11, further comprising a second connector provided in the docking port of the display unit and a complementary second jack provided on the portable device; wherein the second connector is a communications signal connector.

16. The combination as defined in claim 11, wherein the user interface of the portable device further comprises a touchscreen, whereby the touchscreen provides a touchscreen interface to the portable computing device when disconnected from the display unit, and whereby the touchscreen provides a touchpad interface to the display unit when the portable computing device and the display unit are connected.

17. The combination as defined in claim 11, wherein the user interface of the portable device further comprises a keypad, whereby the keypad provides alpha-numeric input to the portable computing device when disconnected from the display unit, and whereby the keypad provides alpha-numeric input to the display unit when the portable computing device and the docking unit are docked together.

18. The combination as defined in claim 11, wherein the display unit further includes a rechargeable power supply and the portable device further includes a rechargeable power supply; and wherein the power supply of the portable device is operationally connected to the power supply of the display unit when the portable device is engaged with the display unit.

19. The combination as defined in claim 11, wherein the portable device comprises a smartphone.

20. The combination as defined in claim 11, wherein the display unit housing has a length and the docking port is oriented at right angles to the length and the portable device is thereby disposed at right angles to the length of the display unit when docked in the docking port.

21. In combination:
a docking display unit and a portable computing device selectively engageable therewith, the display unit comprising:
    a housing having a first region and a second region and a hinge connecting the first and second regions; whereby the first region is selectively foldable onto the second region;
    a display screen provided in the first region;
    a keyboard provided in the second region;
    a docking port defined in the second region adjacent the keyboard; at least one connector provided in the docking port; and wherein the portable device includes:
    a housing, at least a portion of which is complementary to the docking port of the display unit;
    a central processing unit disposed within the housing of the portable device;
    at least one jack provided on the housing of the portable device and being operationally connected to at least one connector on the display unit when the portable device is physically received within the docking port, whereby the portable device is electronically connected to the display unit;
wherein the display unit housing has a length and the docking port is oriented at right angles to the length and the portable device is thereby disposed at right angles to the length of the display unit when docked in the docking port;
wherein the housing of the portable device has a first length and the docking port has a second length, and wherein the first length is greater than the second length; and
whereby the portable device extends outwardly for a distance beyond a front edge of the display unit.

22. The combination as defined in claim 11, wherein the docking port is recessed into the interior wall of the display unit's housing; and when the portable device is engaged in the docking port; and exterior face of the display unit is recessed relative to the interior wall of the display unit's housing.

23. A method of operating a computing device comprising the steps of:
supplying a first computing device housing with a docking port and a display screen;
docking a portable computing device having a touchscreen into the docking port;
allowing the portable computing device to communicate with the first computing device, using the touchscreen on the portable computing device as a touch pad on the first computing device, whereby the touchpad is operably connected to the display screen such that use of the touchscreen does not result in a movement of the portable computing device relative to the docking port;
sliding the portable computing device into a recessed region on the first computing device;
engaging a communications port on the portable computing device with a complementary communications port on the first computing device to operatively connect the first computing device and portable computing device together; and
pivoting a first section of the first computing device between a first closed position where the first section is in abutting contact with a second section thereof, and a second open position where the first section is not in abutting contact with the second section.

24. The method of operating a computing device as defined in claim 23, wherein the step of sliding the portable computing device into the recessed region is accomplished when the first section is in either of the first closed position and second open position.

25. The method of operating a computing device as defined in claim 23, further comprising the step of:
charging a rechargeable power supply in the portable computing device from a power supply in the first computing device.

* * * * *